Patented Sept. 9, 1952

2,610,175

UNITED STATES PATENT OFFICE 2,610,175

COMPLEX CHROMIUM COMPOUNDS OF MONOAZO-DYESTUFFS

Willy Widmer, Bottmingen, and Arthur Buehler, Rheinfelden, Switzerland, assignors to Ciba Limited, Basel, Switzerland, a Swiss firm No Drawing. Application October 31, 1950, Serial No. 193,308. In Switzerland November 18, 1949

13 Claims. (Cl. 260—145)

This invention relates to the manufacture of valuable new complex chromium compounds of monoazo-dyestuffs, which are free from sulfonic acid groups and carboxyl groups and correspond to the general formula

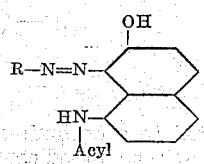

in which R indicates a benzene radical which contains in ortho-position to the azo group a hydroxyl group.

According to the invention the new compounds are obtained when upon a mixture of different monoazo-dyestuffs corresponding to the above formula, one of which contains in the radical R a sulfonic acid amide group, agents providing chromium are reacted in such a manner that dyestuffs containing chromium are obtained which contain per molecule of monoazo-dyestuff less than one atom of chromium in complex combination.

For the manufacture of the monoazo-dyestuffs corresponding to the above formula, which serve as starting materials and which contain in the radical R of the diazo component a sulfonic acid amide group, there are concerned diazo compounds from ortho-hydroxyaminobenzene sulfonic acid amides. These ortho-hydroxyaminobenzene sulfonic acid amides may be unsubstituted or substituted in the benzene nucleus or on the nitrogen atom of the sulfonic acid amide group. As particularly valuable ortho-hydroxyaminobenzene sulfonic acid amides have proved, for example, the 6-nitro-2-amino-1-hydroxybenzene-4-sulfonic acid amide, the 2-amino-1-hydroxybenzene-4-sulfonic acid - hydroxyethylamide, the 2-amino-1-hydroxybenzene - 4 - sulfonic acid methylamide, the 2-amino-1-hydroxybenzene-5-sulfonic acid amide and the 2-amino-1-hydroxybenzene-4-sulfonic acid amide.

The monoazo-dyestuffs corresponding to the above formula which are used with the dyestuffs containing sulfonic acid amide groups, for the production of the mixtures serving as starting materials in the present process, can be obtained by coupling ortho-hydroxydiazo-compounds of the benzene series, which are free from sulfonic acid groups, carboxyl groups and sulfonic acid amide groups, with 1-acylamino-7-hydroxynaphthalenes which are likewise free from sulfonic acid groups, carboxyl groups and sulfonic acid amide groups. In this case as ortho-hydroxydiazo-compounds there are suitably used diazo-compounds of such ortho-hydroxyamines of the benzene series, the benzene nuclei of which contain in addition to the hydroxyl and amino group also further substituents such as halogen atoms (for example, chlorine), alkyl groups (for example, methyl), alkoxy groups (for example, methoxy), nitro-groups, —CO-alkyl groups (for example, —CO—CH₃), sulfone groups (for example —SO₂—CH₃), or acylamino groups (for example, acetylamino). Valuable results are produced from the following ortho-hydroxyamines: 4-methyl - 2 - amino-1-hydroxybenzene, 4-methoxy-2-amino-1-hydroxybenzene, 4-chloro-2-amino-1-hydroxybenzene, 4:6-dichloro-2-amino-1-hydroxybenzene, 4-nitro-2-amino - 1 - hydroxybenzene, 5-nitro-2-amino - 1 - hydroxybenzene, 6-nitro-4-methyl-2-amino-1-hydroxybenzene, 6-acetylamino - 4 - chloro-2-amino-1-hydroxybenzene, 5-nitro-4-chloro-2-amino-1 - hydroxybenzene, 4-nitro-6-chloro-2-amino - 1 - hydroxybenzene, 4:6-dinitro-2-amino-1 - hydroxybenzene, 6-nitro-4-chloro-2-amino - 1-hydroxybenzene, 4-nitro-6-acetylamino-2 - amino-1-hydroxybenzene, 3-amino-4-hydroxy-acetophenone, 5-nitro-3-amino - 4 - hydroxy - acetophenone, 2-amino - 1 - hydroxybenzene - 4 - carboxylic acid amide.

The 1-acylamino-7-hydroxynaphthalenes serving as coupling components in the production of the monoazo-dyestuffs contain no further substituents in the naphthalene nucleus. The acyl radicals of these compounds, apart from the fact that they must be free from sulfonic acid groups and carboxyl groups, may have any suitable constitution. Advantageously such 1-acylamino-7-hydroxy-naphthalenes are selected of which the acyl radical is simply constituted, for example contains only the elements C, H and O and contains at the most six carbon atoms and two oxygen atoms. Such acyl radicals are for example those of the general formula $$-CO-C_nH_{2n+1}$$

in which $n$ is a whole number which is 1 to 5. In this case also 7-hydroxynaphthyl-(1)-carbamic acid esters are to be understood as included among 1-acylamino-7-hydroxynaphthalenes. As examples of 1-acylamino-7-hydroxynaphthalenes there may be metnioned: 1-formylamino-7-hydroxynaphthalene, 1-acetylamino-7-hydroxynaphthalene, 1-propionylamino - 7 - hydroxynaphthalene, 1-$n$-butyrylamino-7-hydroxynaphthalene, 1-capronylamino-7-hydroxynaphthalene, 7-hydroxynaphthyl-(1)-carbamic acid methyl ester, 7-hydroxynaphthyl-(1)-carbamic acid ethyl ester.

The coupling of the ortho-hydroxydiazo compounds with the 1-acylamino-7-hydroxynaphthalenes can be carried out by customary methods known per se, preferably in an alkaline medium, for example a medium alkaline with alkali carbonate or alkali hydroxide.

When the coupling reaction is complete the dyestuffs can easily be separated from the coupling mixture by filtering off, since owing to the fact that they contain no solubilizing groups they are only of low solubility in water. They are advantageously used for the chroming as a filter cake without intermediate drying. The mixtures of monoazo dyestuffs to be chromed can be obtained by mixing two or more than two separately prepared monoazo dyestuffs. They can also be obtained by simultaneously coupling one molecule of ortho-hydroxydiazo-benzene sulfonic acid amide and one molecule of an ortho-hydroxydiazobenzene which is free from sulfonic acid amide groups with two molecules of a 1-acyl-amino-7-hydroxynapthalene.

The monoazo-dyestuffs obtainable according to the above directions and serving as starting materials for the present process are in part new. In general even as alkali compounds they are not particularly easily soluble in water.

According to the present process the treatment with the agents providing chromium takes place in such a manner that a complex chromium compound is produced which contains at least two different monoazo dyestuffs and less than one atom of chromium per molecule of monoazo dyestuff. Accordingly the chroming is suitably carried out with such agents providing chromium and according to such methods as, in accordance with experience, produce complex chromium compounds of this constitution. It is to be recommended in general to use for two molecules of dyestuff less than two atoms of chromium and/or to carry out the chroming in a weakly acid or alkaline medium. Accordingly those chromium compounds which are stable in an alkaline medium are also especially well suited to the carrying out of the process, as for example such chromium compounds of aliphatic hydroxy-carboxylic acids or preferably aromatic ortho-hydroxycarboxylic acids, as contain the chromium in complex combination. As examples of aliphatic hydroxycarboxylic acids there may be mentioned among others lactic acid, glycollic acid, citric acid and especially tartaric acid, while among the aromatic ortho-hydroxycarboxylic acids there should be mentioned for example such of the benzene series, for example 4-, 5- or 6-methyl-1-hydroxybenzene-2-carboxylic acid and primarily the 1-hydroxybenzene-2-carboxylic acid which is not further substituted.

The conversion of the dyestuffs into the complex chromium compounds takes place with advantage in the hot, with or without pressure, for example at the boiling temperature of the reaction mixture, if desired in the presence of suitable additions, for example in the presence of salts of organic acids, of bases, organic solvents or other media which promote the complex formation.

As an example a mixture of two different or a mixture of more than two different dyestuffs of the general formula set forth above, one of which contains in the radical R a sulfonamide group, for example a mixture of the two dyestuffs

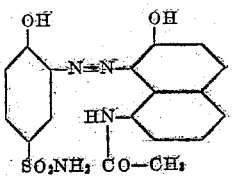

and

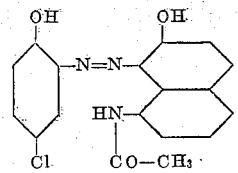

or of the three dyestuffs

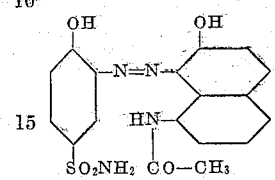 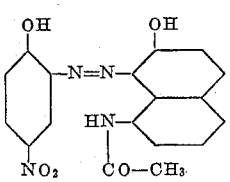

and

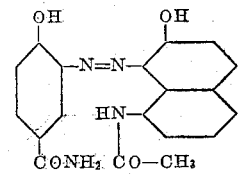

may be subjected to a chroming process as described above, whereby mixed complexes are produced in which for the most part differing dyestuffs, for example such containing sulfonamide groups and such as are free from sulfonamide groups, are attached together by a chromium atom.

The dyestuffs obtainable according to the present process can also be produced according to a modification of this process wherein chromium compounds of monoazo-dyestuffs containing one atom of complex combined chromium per molecule of dyestuff (1:1-complexes) are reacted with monoazo-dyestuffs free from chromium, in which case monoazo-dyestuffs which are free from chromium and which contain chromium (1:1-complexes) are used which are free from sulfonic acid groups and carboxyl groups and correspond to the general formula

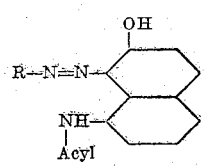

in which R indicates an aromatic radical of the benzene series which contains a hydroxyl group in ortho-position to the azo group and in which also either the monoazo dyestuffs free from chromium or those containing chromium, contain also a sulfonic acid amide group in the radical R.

The new products obtainable according to the present process and the modification thereof are chromium compounds containing different monoazo-dyestuffs and per molecule of monoazo-dyestuff less than one atom of chromium in complex combination. These chromium compounds contain different monoazo dyestuffs which correspond to the general formula

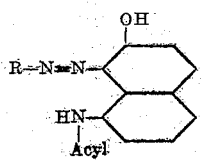

in which R indicates a benzene radical which contains a hydroxyl group in ortho-position to the azo group, one of these monoazo dyestuffs containing in the radical R a sulfonic acid amide group.

The new dyestuffs containing chromium are soluble in water and in fact of better solubility than the starting dyestuffs free from metal which are used in their manufacture. They are suitable for the dyeing and printing of a wide variety of materials, but principally for the dyeing of animal materials such as silk, leather and especially wool and synthetic fibers from superpolyamides and superpolyurethanes. In contradistinction to the chromium compounds of dyestuffs containing sulfonic acid groups, with which it is advantageous to dye from a strong acid, for example sulfuric acid, bath, these new chromium compounds of monoazo-dyestuffs which are free from sulfonic acid groups are primarily suited to dyeing from neutral to weakly acid baths. Wool dyeings obtainable in this manner are distinguished by good uniformity, good wet fastness properties and very good fastness to light.

The following examples illustrate the invention, the parts and percentages being by weight unless otherwise stated and the relation between parts by weight and parts by volume being the same as that betwen the kilogram and the liter:

Example 1

18.8 parts of 2-amino-1-hydroxybenzene-4-sulfonic acid amide are suspended in 200 parts of water and 15 parts by volume of 10N-hydrochloric acid and diazotized at 5–10° C. with 25 parts by volume of 4N-sodium nitrite solution. The diazo compound, neutralized by addition of sodium carbonate, is allowed to flow into a solution cooled with ice to 0° C. of 20.5 parts of 1-acetylamino-7-hydroxynaphthalene in 52 parts by volume of 2N-sodium hydroxide solution and 50 parts by volume of 2N-sodium carbonate solution. When the coupling is complete the separated dyestuff is filtered and washed with dilute sodium chloride solution. When dry it constitutes a brown-black powder which dissolves in hot water with a violet and in concentrated sulfuric acid with a pure red color. The dyestuff dyes wool by the single bath chroming process in fast grey shades.

If in the above example instead of 18.8 parts of 2-amino-1-hydroxybenzene-4-sulfonic acid amide, 23.3 parts of 6-nitro-2-amino-1-hydroxybenzene-4-sulfonic acid amide are used, a dyestuff of similar properties is obtained which dyes wool somewhat more violet shades.

By using instead of the 20.5 parts of 1-acetylamino-7-hydroxynaphthalene, 22.9 parts of 1-n-butyryl-amino-7-hydroxynaphthalene, a dyestuff which is likewise of similar properties is obtained.

Example 2

18.8 parts of 2-amino-1-hydroxybenzene-5-sulfonic acid amide are suspended in 200 parts of water and 15 parts by volume of 10N-hydrochloric acid and diazotized at 5–10° C. with 25 parts by volume of 4N-sodium nitrite solution. The diazo compound, neutralized by addition of sodium carbonate, is allowed to flow into a solution cooled with ice to 0° C. of 20.5 parts of 1-acetylamino-7-hydroxynaphthalene in 52 parts by volume of 2N-sodium hydroxide solution and 50 parts by volume of 2N-sodium carbonate solution. When the coupling is complete the separated dyestuff is filtered and washed with dilute sodium chloride solution. When dry it forms a black powder which dissolves in hot water with a blue and in concentrated sulfuric acid with a violet color. The dyestuff dyes wool by the single bath chroming process in fast grey-blue shades.

Example 3

40 parts of the dyestuff obtained according to Example 1, paragraph 1, and 35.5 parts of the dyestuff obtained by known methods from 4-chloro-2-amino-1-hydroxybenzene and 1-acetyl-amino-7-hydroxynaphthalene, are suspended in 3000 parts of water and treated with 220 parts of a solution of sodium chromsalicylate with a chromium content of 2.6 per cent. After 6 hours boiling under a reflux condenser the chroming is completed. The chromium compound obtained is separated by addition of sodium chloride and filtered off. When dried it constitutes a black powder which dissolves in water with a grey-blue and in concentrated sulfuric acid with a red color and dyes wool both from a neutral and also from an acetic acid bath in uniform grey-blue shades of excellent fastness to light.

The dark green solution of sodium chromsalicylate is obtained by boiling 362 parts of an aqueous chromic sulfate solution with a chromium content of 7.2 per cent. with 138 parts of salicylic acid, dissolving the chromsalicylic acid produced by addition of so much 30 per cent. sodium hydroxide solution that a distinct alkaline reaction to phenolphthalein is produced and making up with water to 1000 parts.

Dyestuffs of similar properties are obtained when the monoazo dyestuffs mentioned in the above example are replaced by those in the following table and the process is carried out in an analogous manner. In the columns A and B are set out the two ortho:ortho'-dihydroxymonoazo-dyestuffs which are in complex combination with the chromium.

| A | B | Color of the aqueous solution | Color of the solution in conc. $H_2SO_4$ | Wool dyeing from an acetic acid bath |
|---|---|---|---|---|
| 40 parts 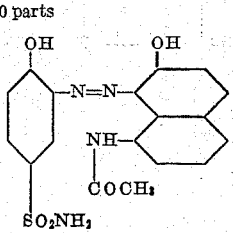 | 41.3 parts 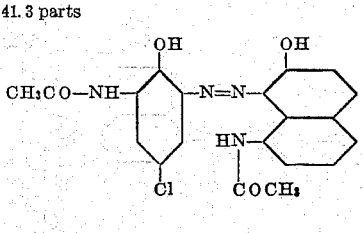 | blue | pink | blue grey. |

| A | B | Color of the aqueous solution | Color of the solution in conc. $H_2SO_4$ | Wool dyeing from an acetic acid bath |
|---|---|---|---|---|
| 40 parts [structure] | 40 parts [structure] | green blue | red | blue grey. |
| 40 parts [structure] | 40 parts [structure] | blue | bluish red | blue grey. |
| 40 parts [structure] | 39 parts [structure] | blue | pink | violet grey. |
| 40 parts [structure] | 36.6 parts [structure] | green blue | red | greenish grey. |
| 40 parts [structure] | 42.3 parts [structure] | blue | red | green blue. |
| 40 parts [structure] | 40 parts [structure] | grey blue | red | grey. |
| 40 parts [structure] | 36.6 parts [structure] | blue green | violet | green grey. |

| A | B | Color of the aqueous solution | Color of the solution in conc. $H_2SO_4$ | Wool dyeing from an acetic acid bath |
|---|---|---|---|---|
| 40 parts (structure) | 38 parts (structure) | blue | pink | blue grey. |
| 40 parts (structure) | 36.5 parts (structure) | blue | red | violet grey. |
| 40 parts (structure) | 36.6 parts (structure) | blue | pink | grey. |
| 41.2 parts (structure) | 35.5 parts (structure) | grey blue | red | grey blue. |
| 41.2 parts (structure) | 36.6 parts (structure) | green blue | red | grey. |
| 40 parts (structure) | 38.4 parts (structure) | grey blue | red | grey. |
| 40 parts (structure) | 39.4 parts (structure) | green blue | red | grey. |

Example 4

26.7 parts of the dyestuff obtained according to Example 1, paragraph 1, 23.7 parts of the dyestuff obtainable from 4-chloro-2-amino-1-hydroxybenzene and 1-acetylamino-7-hydroxynaphthalene and 24.3 parts of the dyestuff obtainable from 2-amino-1-hydroxybenzene-4-carboxylic acid amide and 1-acetylamino-7-hydroxynaphthalene are suspended in 3000 parts of water and treated with 220 parts of a solution of sodium chromsalicylate with a chromium content of 2.6 per cent. After boiling for 6 hours under a reflux condenser the chroming is complete. The chromium compound obtained is separated by addition of sodium chloride and filtered off. It forms when dry a black powder which dissolves in water with a grey-blue and in concentrated sulfuric acid with a red color and which dyes wool both from a neutral and also from an acetic acid bath in uniform grey-blue shades of excellent fastness to light.

When in the above example instead of the dyestuff from 4-chloro-2-amino-1-hydroxybenzene and 1-acetylamino-7-hydroxynaphthalene, 24.4 parts of the dyestuff obtainable from 4-nitro-2-amino-1-hydroxybenzene and 1-acetylamino-7-hydroxynaphthalene are used, a chromium compound is obtained of similar properties which dyes wool in uniform greenish-grey shades.

Example 5

0.5 part of the dyestuff containing chromium obtainable according to Example 3, paragraph 1, is dissolved in 4000 parts of water, 10 parts of crystalline sodium sulfate are added and 100 parts of well wetted wool are entered at 40-50° C. into the dyebath thus obtained. Then 3 parts of 40 per cent acetic acid are added, the whole brought to the boil within ½ hour and dyed at the boil for ¾ hour. Finally the wool is rinsed with cold water and dried. A uniform grey-blue dyeing is obtained of good fastness to washing and outstanding fastness to light.

A uniform grey-blue dyeing of good fastness to washing and outstanding fastness to light is likewise obtained by proceeding according to the directions of this example but without adding acetic acid to the dyebath.

What is claimed is:

1. A chromium compound which contains at least two different monoazo-dyestuffs in a complex in which the proportion of the number of chromium atoms in complex combination to the number of monoazo-dyestuff molecules is less than 1:1, each of the monoazo-dyestuffs present in the complex being free from sulfonic acid groups and carboxyl groups and corresponding to the general formula

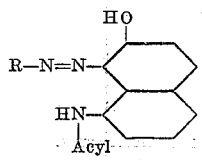

in which R indicates a benzene radical which contains a hydroxyl group in ortho-position to the azo-group, and in which one of the monoazo-dyestuffs present in the complex also contains in the radical R a sulfonic acid amide group.

2. A chromium compound which contains two different monoazo-dyestuffs in a complex in which the proportion of the number of chromium atoms in complex combination to the number of monoazo-dyestuff molecules is less than 1:1, each of the monoazo-dyestuffs present in the complex being free from sulfonic acid groups and carboxyl groups and corresponding to the general formula

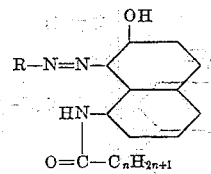

in which R indicates a benzene radical which contains a hydroxyl group in ortho-position to the azo-group and $n$ indicates a whole number up to 5, and in which one of the monoazo-dyestuffs present in the complex also contains in the radical R a sulfonic acid amide-group.

3. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

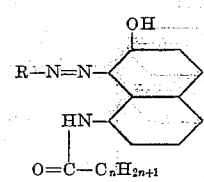

in which R represents a benzene radical which contains a hydroxyl group in ortho-position to the azo-group, and the other monoazo-dyestuff also present in the complex corresponding to the formula

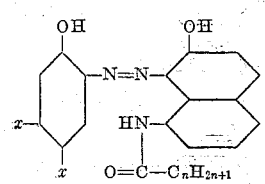

in which one of the $x$'s represents the $-SO_2-NH_2$ group, the other standing for hydrogen, and $n$ represents a whole number up to 5.

4. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

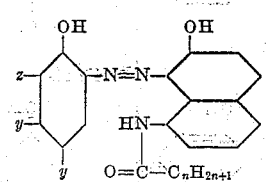

in which $n$ represents a whole number up to 5, $z$ represents a member selected from the class consisting of hydrogen, halogen, nitro and acylamino groups, one of the $y$'s represents a hydrogen atom and the other stands for a member selected from the class consisting of hydrogen, halogen, methyl and nitro groups, and the other monoazo-dyestuff also present in the complex corresponding to the formula

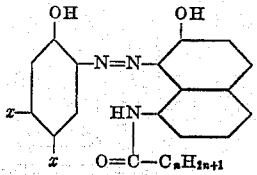

in which one of the $x$'s represents the —$SO_2$—$NH_2$ group, the other standing for hydrogen, and $n$ represents a whole number up to 5.

5. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

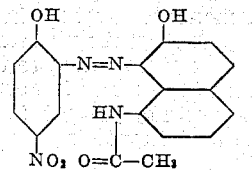

and the other monoazo-dyestuff also present in the complex corresponding to the formula

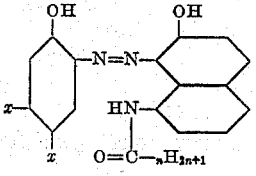

in which one of the $x$'s represents the —$SO_2$—$NH_2$ group, the other standing for hydrogen, and $n$ represents a whole number up to 5.

6. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

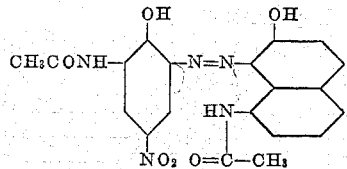

and the other monoazo-dyestuff also present in the complex corresponding to the formula

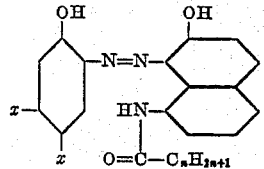

in which one of the $x$'s represents the —$SO_2$—$NH_2$ group, the other standing for hydrogen, and $n$ represents a whole number up to 5.

7. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

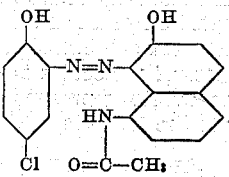

and the other monoazo dyestuff also present in the complex corresponding to the formula

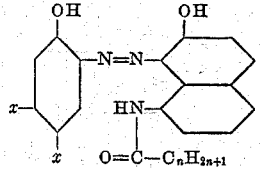

in which one of the $x$'s represents the —$SO_2$—$NH_2$ group, the other standing for hydrogen, and $n$ represents a whole number up to 5.

8. A chromium compound which contains two different monoazo-dyestuffs which are free from sulfonic acid groups and carboxyl groups in a complex in which the proportion of the number of chromium atoms in complex combination to the number of monoazo-dyestuff molecules is about 1:2, one of the monoazo-dyestuffs present in the complex corresponding to the formula

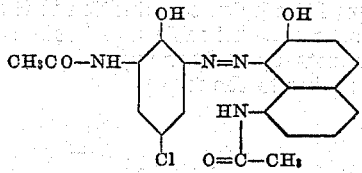

and the other monoazo dyestuff also present in the complex corresponding to the formula

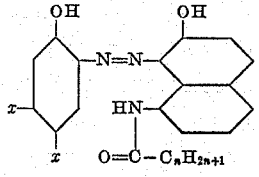

in which one of the $x$'s represents the

—$SO_2$—$NH_2$ group, the other standing for hydrogen, and $n$ represents a whole number up to 5.

9. The chromium compound which contains two different monoazo-dyestuffs in a complex in which the proportion of the number of chromium atoms in complex combination to the number of monoazo-dyestuff molecules is about 1:2, one of the monoazo-dyestuffs present in the complex corresponding to the formula

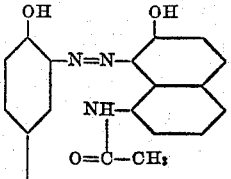

and the other corresponding to the formula

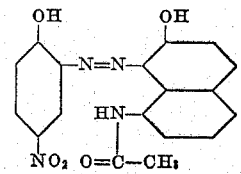

10. The chromium compound which contains two different monoazo-dyestuffs in a complex in which the proportion of the number of chromium atoms in complex combination to the number of monoazo-dyestuff molecules is about 1:2, one of the monoazo-dyestuffs present in the complex corresponding to the formula

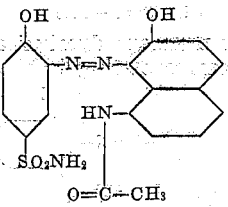

and the other corresponding to the formula

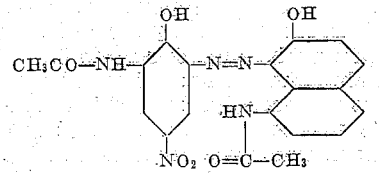

11. The chromium compound which contains two different monoazo-dyestuffs in a complex in which the proportion of the number of chromium atoms in complex combination to the number of monoazo-dyestuff molecules is about 1:2, one of the monoazo-dyestuffs present in the complex corresponding to the formula

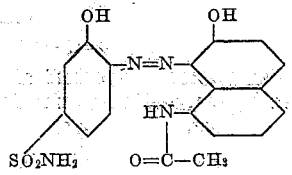

and the other corresponding to the formula

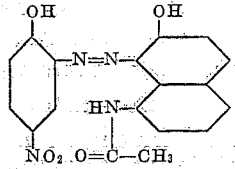

12. The chromium compound which contains two different monoazo-dyestuffs in a complex in which the proportion of the number of chromium atoms in complex combination to the number of monoazo-dyestuff molecules is about 1:2, one of the monoazo-dyestuffs present in the complex corresponding to the formula

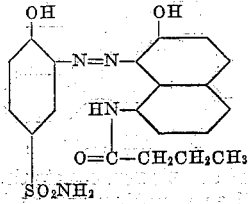

and the other corresponding to the formula

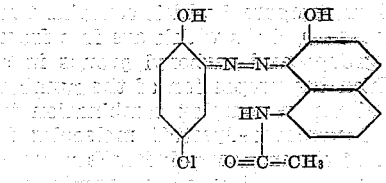

13. The chromium compound which contains two different monoazo-dyestuffs in a complex in which the proportion of the number of chromium atoms in complex combination to the number of monoazo-dyestuff molecules is about 1:2, one of the monoazo-dyestuffs present in the complex corresponding to the formula

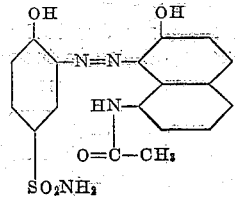

and the other corresponding to the formula

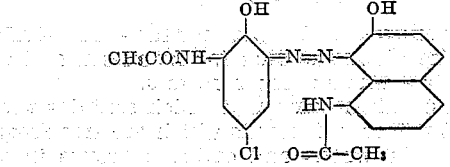

WILLY WIDMER.
ARTHUR BUEHLER.

REFERENCES CITED

The following references are of record in the file of this patent:

UNITED STATES PATENTS

| Number | Name | Date |
|---|---|---|
| 1,325,841 | Fritzsche | Dec. 23, 1919 |
| 1,835,821 | Straub et al. | Dec. 8, 1931 |
| 1,925,434 | Clingestein et al. | Sept. 5, 1933 |
| 1,989,569 | Straub et al. | Jan. 29, 1935 |